(12) United States Patent
Clemens et al.

(10) Patent No.: US 12,398,473 B2
(45) Date of Patent: Aug. 26, 2025

(54) CONCENTRATED ALUMINUM COMPOSITIONS FOR AQUEOUS CORROSION CONTROL

(71) Applicant: BL Technologies, Inc., Minnetonka, MN (US)

(72) Inventors: Janine Clemens, Minnetonka, MN (US); Robert Hendel, Minnetonka, MN (US); Paul Frail, Minnetonka, MN (US); Judy Barron, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 18/627,968

(22) Filed: Apr. 5, 2024

(65) Prior Publication Data

US 2024/0271288 A1    Aug. 15, 2024

Related U.S. Application Data

(62) Division of application No. 17/437,716, filed as application No. PCT/US2020/025158 on Mar. 27, 2020, now Pat. No. 11,982,003.

(60) Provisional application No. 62/827,005, filed on Mar. 30, 2019.

(51) Int. Cl.
    C23F 11/18     (2006.01)
    C02F 5/10      (2023.01)
    C02F 5/14      (2023.01)
    C02F 103/02    (2006.01)

(52) U.S. Cl.
    CPC ............ C23F 11/182 (2013.01); C02F 5/105 (2013.01); C02F 5/145 (2013.01); C02F 2103/023 (2013.01)

(58) Field of Classification Search
    None
    See application file for complete search history.

(56) References Cited

U.S. PATENT DOCUMENTS

| | | | |
|---|---|---|---|
| 7,759,299 B2 | 7/2010 | Smith et al. | |
| 8,772,221 B2* | 7/2014 | Silvernail | C08L 43/02 510/147 |
| 9,290,850 B2† | 3/2016 | Erickson | |
| 9,290,851 B2 | 3/2016 | Gill et al. | |
| 9,738,790 B2 | 8/2017 | Hofmann et al. | |
| 10,035,977 B2 | 7/2018 | Dahlquist Howlett et al. | |
| 11,982,003 B2* | 5/2024 | Clemens | C23F 11/182 |
| 2005/0218370 A1* | 10/2005 | Egawa | C09K 5/10 252/70 |
| 2010/0111756 A1* | 5/2010 | Crovetto | C02F 5/105 252/387 |
| 2011/0269660 A1 | 11/2011 | Miralles | |
| 2012/0053105 A1 | 3/2012 | Olson et al. | |
| 2015/0004054 A1† | 1/2015 | Richardson | |
| 2016/0215400 A1 | 7/2016 | Kalakodimi et al. | |

FOREIGN PATENT DOCUMENTS

| | | |
|---|---|---|
| JP | 2012041606 A | 3/2012 |
| WO | 2014107460 A1 | 7/2014 |

OTHER PUBLICATIONS

Third Party Submission filed Dec. 16, 24.*
International Search Report and Written Opinion for International Application No. PCT/US2020/025158, mailed Jun. 18, 2020; 14 pp.

* cited by examiner
† cited by third party

*Primary Examiner* — Joseph D Anthony
(74) *Attorney, Agent, or Firm* — McCarter & English, LLP

(57) ABSTRACT

A composition for corrosion control in aqueous systems, the composition providing a formulation of a concentrated aluminum corrosion inhibitor; and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid. A method for corrosion control in aqueous systems, the method providing a concentrated formulation, the concentrated formulation having an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid; and delivering the concentrated formulation to an aqueous stream.

17 Claims, No Drawings

CONCENTRATED ALUMINUM COMPOSITIONS FOR AQUEOUS CORROSION CONTROL

CROSS-REFERENCE TO RELATED APPLICATIONS

This application is a divisional of U.S. application Ser. No. 17/437,716 filed Sep. 9, 2021, which is a national phase of International Patent Application No. PCT/US2020/025158 filed Mar. 27, 2020, which claims the priority benefit of application Ser. No. 62/827,005 filed Mar. 30, 2019, the entireties of which are incorporated by reference.

FIELD OF INVENTION

The disclosed technology generally described hereinafter provides for a composition and method for corrosion control, and more specifically, a composition and method for corrosion control of aqueous systems, the composition having a formulation of a concentrated aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

BACKGROUND OF THE INVENTION

Various corrosion inhibitor compositions having concentrated aluminum and a variety of polycarboxylic acids have been developed. However, formulating such compositions with aluminum salts becomes difficult due to limited solubility within specific pH ranges. Additional challenges arise due to the multidentate ability of cationic aluminum. For example, aluminum is often used as a flocking agent to precipitate water soluble species, but when added as a concentrated formula, insoluble colloids form, which impair the aluminum and polycarboxylic acid from being effective as corrosion inhibitors.

Thus, what is needed in the art is a composition and method for corrosion control providing stable formulations of concentrated aluminum that also provide effective corrosion inhibition in aqueous systems.

SUMMARY OF THE INVENTION

The disclosed technology generally described hereinafter provides for a composition and method for corrosion control, and more specifically, a corrosion control composition having a formulation of a concentrated aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

In one aspect of the disclosed technology, a composition for corrosion control in aqueous systems is provided. The composition comprising a formulation of a concentrated aluminum corrosion inhibitor; and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

In some embodiments, the aluminum corrosion inhibitor comprises an aluminum salt. In some embodiments, the aluminum salt comprises aluminum halides, aluminum sulphate, aluminum hydroxide, aluminum phosphate, aluminum oxide, sodium aluminate, or combinations thereof. In some embodiments, the aluminum corrosion inhibitor comprises complexes of (i) citrate and aluminum, (ii) saccharic acid and aluminum, or (iii) aluminum and gluconate.

In some embodiments, the aluminum corrosion inhibitor is aluminum sulfate and is present at a concentration of approximately 0.1-2 wt % actives. In some embodiments, the aluminum corrosion inhibitor is sodium aluminate and is present at a concentration of approximately 0.1-2 wt % actives.

In some embodiments, the formulation comprises a polycarboxylic acid, and the polycarboxylic acid polymer comprises polymaleic acid, polycarboxylic sulfonic acid, polyacrylic acid, hydroxyacids, phosphonocarboxylic acids, polyhydroxysuccinic acids, polymaleic anhydride, phosphonates, 1-Hydroxy Ethylidene-1,1-Diphosphonic Acid, 2-Phosphonobutane-1,2,4-tricarboxylic acid, amino alkylene phosphonic acids, polymers featuring one monomeric group with a phosphonic acid, and/or combinations thereof.

In some embodiments, the polycarboxylic acid polymer is a polycarboxylic sulfonic acid polymer. In some embodiments, the polycarboxylic acid polymer is a polymaleic acid/polycarboxylic sulfonic acid polymer blend. In some embodiments, the formulation comprises a polycarboxylic acid, and the polycarboxylic acid polymer is present at a concentration of about 3 to about 50% polymer actives.

In some embodiments, the concentration ratio of the aluminum corrosion inhibitor to the polycarboxylic acid polymer is greater than about 1:100. In some embodiments, the pH of the formulation is (a) less than 4, or (b) greater than 10.

In some embodiments, the aluminum corrosion inhibitor is selected from the group consisting of aluminum sulfate and sodium aluminate. In some embodiments, the aluminum corrosion inhibitor is aluminum sulfate and is present at a concentration of approximately 0.1-2 wt % actives. In some embodiments, the aluminum corrosion inhibitor is sodium aluminate and is present at a concentration of approximately 0.1-2 wt % actives.

In yet another aspect of the disclosed technology, a composition for corrosion control in aqueous systems is provided. The composition comprising a formulation of a concentrated aluminum corrosion inhibitor; and one or more of (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid In yet another aspect of the disclosed technology, a method for corrosion control in aqueous systems is provided. The method comprises providing a concentrated formulation, the concentrated formulation comprising an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid; and delivering the concentrated formulation to an aqueous stream.

In some embodiments, the aluminum corrosion inhibitor comprises an aluminum salt. In some embodiments, the aluminum salt comprises aluminum halides, aluminum sulphate, aluminum hydroxide, aluminum phosphate, aluminum oxide, sodium aluminate, or combinations thereof.

In some embodiments, the formulation comprises a polycarboxylic acid, and the polycarboxylic acid polymer comprises polymaleic acid, polycarboxylic sulfonic acid, polyacrylic acid, hydroxyacids, phosphonocarboxylic acids, polyhydroxysuccinic acids, polymaleic anhydride, phosphonates, 1-Hydroxy Ethylidene-1,1-Diphosphonic Acid, 2-Phosphonobutane-1,2,4-tricarboxylic acid, amino alkylene phosphonic acids, polymers featuring one monomeric group with a phosphonic acid, and/or combinations thereof.

In some embodiments, the aqueous stream comprises an industrial water-cooling system. In some embodiments, the formulation is stable. In some embodiments, the formulation has a pH range that is (a) less than 4, or (b) greater than 10. In some embodiments, the formulation has a pH that is less than 2. In some embodiments, the formulation has a pH that is greater than 12.

In some embodiments, the concentration ratio of the aluminum corrosion inhibitor to the polycarboxylic acid polymer is greater than about 1:100. In some embodiments, the concentrated formulation is delivered to an aqueous stream in an amount of about 1 ppm to about 1000 ppm.

DETAILED DESCRIPTION OF EXEMPLARY EMBODIMENTS

The disclosed technology generally provides for a composition and method for corrosion control, and more specifically, a composition and method for corrosion control of aqueous systems, the composition having a formulation of a concentrated aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

It was surprisingly discovered that a critical pH range and/or a specific concentration ratio is required to provide stable formulations of concentrated aluminum compositions that also provide effective corrosion inhibition. Such stable and effective concentrated aluminum compositions/formulations can be composed when maintained within specific pH ranges. When outside such ranges, the disclosed aluminum corrosion inhibitors are ineffective at forming passivation films on iron metallurgies.

The disclosed technology provides for a composition for corrosion control in aqueous systems. In some embodiments, the composition provides for a formulation of a concentrated aluminum corrosion inhibitor, and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

In other embodiments, the composition comprises a formulation of a concentrated aluminum corrosion inhibitor; and one or more of (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid The composition comprises a concentrated aluminum corrosion inhibitor. When used in a concentrated formulation, there is the ability for aluminum to coordinate with the polyacids present in corrosion control compositions, thus creating an insoluble polymer. In order for an aluminum corrosion inhibitor to be effective in a concentrated formula, the aluminum corrosion inhibitor must be delivered to an aqueous stream in a soluble form.

Without being bound by a particular theory, it is believed that if the presently disclosed formulation has a pH of less than 4 or greater than 10, when delivered into an aqueous stream that has a pH from 7 to 9, the corrosion control composition of the present technology allows for the delivery of a higher amount of soluble aluminum, which will therefore be active for corrosion control. In contrast, with corrosion control compositions having a pH of between about 5-9, higher amounts of insoluble aluminum are delivered to the aqueous system, and thus is not active or effective for corrosion control.

In some embodiments, the aluminum corrosion inhibitor comprises an aluminum salt. In some embodiments, the aluminum salt comprises, but is not limited to, aluminum halide, aluminum sulphate, aluminum hydroxide, aluminum phosphate, aluminum oxide, sodium aluminate, and/or combinations thereof. In some embodiments, the aluminum corrosion inhibitor comprises organic aluminum complexes, such as, but not limited to, citric aluminum, saccharic acid aluminum, and/or aluminum gluconate.

In some embodiments, the aluminum corrosion inhibitor is present at a concentration of about 0.1-2% actives. It should be understood that the percentage of actives describes the active content of aluminum in the disclosed formulation. In other embodiments, the aluminum corrosion inhibitor is present at a concentration of about 0.5-1.5% actives, in other embodiments, about 0.75-1.0% actives, and in other embodiments, about 0.8-0.9% actives.

In some embodiments, the aluminum corrosion inhibitor is present at a concentration of about 1-10 wt % of the final product. In other embodiments, the aluminum corrosion inhibitor is present at a concentration of about 1.5-9.5 wt %, in other embodiments, about 2-8 wt %, and in other embodiments, about 3-7 wt %.

In some embodiments, the aluminum corrosion inhibitor is aluminum sulfate and is present at a concentration of about 0.1-2 wt % actives. In other embodiments, the aluminum corrosion inhibitor is sodium aluminate and is present at a concentration of about 0.1-2 wt % actives.

In some embodiments, the composition provides for a polycarboxylic acid polymer. In some embodiments, the polycarboxylic acid polymer comprises, but is not limited to, polymaleic acid, polycarboxylic sulfonic acid, polyacrylic acid, hydroxyacids, phosphonocarboxylic acids, polyhydroxysuccinic acids, polymaleic anhydrides, phosphonates, 1-Hydroxy Ethylidene-1,1-Diphosphonic Acid (HEDP), 2-Phosphonobutane-1,2,4-tricarboxylic acid (PBTC), amino alkylene phosphonic acids, polymers featuring one monomeric group with a phosphonic acid, and/or combinations thereof.

In some embodiments, the polycarboxylic acid polymer is polycarboxylic sulfonic acid polymer. It should be understood that the polycarboxylic sulfonic acid polymer may include, but is not limited to, a co-, ter-, or quad polymer, where one monomer is acrylic acid, or a repeating monomer unit featuring at least one carboxylic acid group, and at least one other monomer features a sulfonic acid group.

In some embodiments, the polycarboxylic acid polymer is a polymaleic acid/polycarboxylic sulfonic acid polymer blend. In some embodiments, the polycarboxylic acid polymer comprises a blend of a polycarboxylic acid and organic phosphonates, polyphosphonates, phosphorus containing materials, or combinations thereof. In other embodiments, the polycarboxylic acid polymer comprises a blend of a polycarboxylic acid, a phosphorus containing material, and a polycarboxylic sulfonic acid.

In some embodiments, the polymaleic acid/polycarboxylic sulfonic acid polymer blend is present at a ratio of 4:1, in other embodiments, at a ratio of 1:1, and in other embodiments, at a ratio of 2:1.

In some embodiments, the polycarboxylic acid polymer is present at a concentration of about 3 to about 44% polymer actives. In other embodiments, the polycarboxylic acid polymer is present at a concentration of about 20 to about 35% polymer actives, and in other embodiments, of about 40 to about 44% polymer actives.

The formulation of the present technology provides for a specific concentration ratio of the concentrated aluminum corrosion inhibitor to (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

In some embodiments, the concentration ratio of the aluminum corrosion inhibitor to the (i)-(vi) compound is about 1:1.5; in other embodiments, about 1:20; in other embodiments, about 1:100, in other embodiments, about 1:120, and in other embodiments, about 1:140. In some embodiments, the concentration ratio of the concentrated aluminum corrosion inhibitor to the (i)-(vi) is greater than about 1:100.

The formulation of the present technology provides for a specific pH range. Without being bound by a particular theory, it is believed that the aluminum cation of the disclosed formulation is soluble at low (i.e. <4) and high (i.e. >10) pH extremes, and achieves a minimal level of solubility around 5-7 pH.

In some embodiments, the pH of the formulation is less than 4, and in other embodiments, the pH of the formulation is greater than 10. In some embodiments, the pH of the formulation is less than 2, and in other embodiments, the pH of the formulation is greater than 12.

The disclosed technology additionally provides for a method for corrosion control in aqueous systems. The method as described herein comprises providing a concentrated formulation, and delivering the concentrated formulation to an aqueous stream.

The concentrated formulation of the present method is stable (i.e. formulation was tested at 122° F./50° C., ambient, and 40° F./4° C. for 6 weeks—formulation remained clear and without any particulate at the conclusion of testing), and has a pH range that is (a) less than 4, or (b) higher than 10. The concentrated formulation comprises an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid.

In some embodiments, the aluminum corrosion inhibitor comprises an aluminum salt. In some embodiments, the aluminum salt comprises aluminum halides, aluminum sulphate, aluminum hydroxide, aluminum phosphate, aluminum oxide, sodium aluminate, and/or combinations thereof.

In some embodiments, the polycarboxylic acid polymer comprises polymaleic acid, polycarboxylic sulfonic acid, polyacrylic acid, hydroxyacids, phosphonocarboxylic acids, polyhydroxysuccinic acids, polymaleic anhydride, phosphonates, 1-Hydroxy Ethylidene-1,1-Diphosphonic Acid, 2-Phosphonobutane-1,2,4-tricarboxylic acid, amino alkylene phosphonic acids, polymers featuring one monomeric group with a phosphonic acid, and/or combinations thereof.

In some embodiments, the method provides a formulation having the concentration ratio of the aluminum corrosion inhibitor to the polycarboxylic acid polymer that is greater than about 1:100. In some embodiments, the method provides a formulation having the concentration ratio of the aluminum corrosion inhibitor to the sulfonic acid polymer that is greater than about 1:100. In some embodiments, the method provides a formulation having the concentration ratio of the aluminum corrosion inhibitor to the combination of a polycarboxylic acid and a polysulfonic acid is greater than about 1:100. In some embodiments, the method provides for a formulation having the concentration ratio of the aluminum corrosion inhibitor to the organic phosphonate is greater than about 1:100. In some embodiments, the method provides for a formulation having the concentration ratio of the aluminum corrosion inhibitor to the combination of a phosphonate and a polycarboxylic acid is greater than about 1:100. In some embodiments, the method provides for a formulation having the concentration ratio of the aluminum corrosion inhibitor to the combination of the combination of a phosphonate and a polysulfonic acid is greater than about 1:100.

The present method further comprises delivering the concentrated formulation to an aqueous stream. It should be understood by a person skilled in the art that the aqueous streams can be any type of industrial water that is used in cooling applications. Such industrial cooling applications may include, but are not limited to, closed loop systems.

In some embodiments, the concentrated formulation is delivered to an aqueous stream in an amount of about 1 ppm to about 1000 ppm. In other embodiments, the concentrated formulation is delivered to an aqueous stream in an amount of about 10 ppm to about 500 ppm, and in other embodiments, about 25 ppm to about 200 ppm.

In some embodiments, the concentrated formulation delivers a soluble $Al^{3+}$ concentration of about 0.1 to 2.0 ppm to an aqueous stream, and in other embodiments, about 0.25 to 0.5 ppm to an aqueous stream.

EXAMPLES

The present invention will be further described in the following examples, which should be viewed as being illustrative and should not be construed to narrow the scope of the disclosed technology or limit the scope to any particular embodiments.

Table 1 provides data which exhibits the characteristics of the formulations as disclosed herein.

TABLE 1

| Product | pH/Appearance | Total Polymer/Aluminum Ratio | Stable Y/N |
|---|---|---|---|
| 1 | 1.5 = clear | 1.5:1 | Y |
| 2 | 13 = clear | 1.5:1 | Y |
| 3 | 1 = clear | 120:1 | Y |
| 4 | 13 = clear | 120:1 | Y |
| 5 | <1 = clear | 120:1 | Y |
| 6 | 1 = clear | 120:1 | Y |
| 7 | 1 = clear | 120:1 | Y |
| 8 | 2 = turbid | 20:1 | N |

TABLE 1-continued

| Product | pH/Appearance | Total Polymer/Aluminum Ratio | Stable Y/N |
|---|---|---|---|
| 9 | 13 = clear | 20:1 | Y |
| 10 | 3 = turbid | 140:1 | N |
| 11 | 13 = clear | 140:1 | Y |
| 12 | 8 = turbid | 100:1 | N |
| 13 | 13 = clear | 100:1 | Y |
| 14 | 7 = turbid | 100:1 | N |
| 15 | 13 = clear | 100:1 | Y |
| 16 | 13 = turbid | 40:1 | N |
| 17 | 13 = clear | 40:1 | Y |

With reference to Table 1, the polymer present in Products 1-2 is a polymaleic acid, the polymer present in Products 3-13 is a polymaleic acid/polycarboxylic sulfonic acid (PCSA) blend, the polymer of Product 14 is polyacrylic acid (PAA<2500 MW), the polymer of Product 15 is polyacrylic acid (PAA>2500 MW), Product 16 is citric acid, and Product 17 is tetrasodium iminodisuccinate.

Products 1-2 (PMA) contain 3% polymer actives, Products 3-7 (PMA/PCSA) contain a 4/1 ratio of both polymers, Products 8-9 (PMA/PCSA) contain a 1/1 ratio, Products 10-11 (PMA/PCSA) contain a 2/1 ratio, Products 12-15 contain a 100:1 ratio, and Products 14-15 (PAA) contain 32% polymer actives. Aluminum species used included Aluminum Sulfate and Sodium Aluminate.

Generally, a soluble and stable solution/mixture or blend is often exhibited by being translucent or low turbidity. When the solution/mixture becomes turbid or opaque, this signifies that aggregates or colloids have formed that are blocking the transmittance of light.

As can be seen in Table 1, Products 1, 3 and 5-7 exhibited a clear appearance, and therefore, a soluble and stable solution/mixture or blend resulted. Such appearance was exhibited at a formulation pH of less than about 1.5. For Products 2, 4, 9, 11, 13 and 15, a soluble and stable solution/mixture or blend was exhibited at a formulation pH of at least 13.

The disclosed formulations of the present technology were evaluated using a Controlled Evaporation Research Tower (CERT). The CERT system allowed accurate prediction of the field performance on a range of metallurgies and water velocities. The CERT system utilized un-cycled make-up water that was circulated through a heat transfer tube so that corrosion and fouling potential could be assessed. The CERT mimicked real cooling tower operations by including a tower segment to effect evaporation and a pre-heater to effect a "delta T" across the tower. The evaporation lead to increasing cycles of concentration and a requirement for make-up water to be added so that system volume is maintained.

The CERT consisted of a 12-liter sump to which the make-up is fed. Upon test initiation, level controllers are utilized to feed make-up to the sump. Two cooling streams were diverted from the CERT sump. The first was diverted past a bypass rack containing all metallurgical specimens (e.g. coupons, corrosion rate probe, heat transfer probe). A second stream was diverted first to a pre-heater which heated the stream to a temperature which would be typical of an outlet exchanger condition and then the stream was channeled to the tower segment. The tower incorporates fill segments where appropriate, as well as fill coupons for biomass analysis. The evaporation rate in this segment was controlled by regulating the induced draft through the tower. In general, evaporation occurred at such a rate that an increase of one cycle of concentration can be achieved in a 24-hour period.

Cooling water flow was diverted back to the sump after cascading through the tower design. All metallurgical corrosion and deposition data was obtained as is information on the tendency for tower fill fouling (visual, gravimetric, and biomass quantification). Protocols have also been developed so as to maintain consistent microbiological (MB) populations in these units thereby enabling dynamic MB/corrosion/deposition studies to be performed.

Table 2 provides results from a heat transfer tube corrosion test.

TABLE 2

| Formulation | pH of formulation | Heat Transfer tube corrosion Result |
|---|---|---|
| 12 | 8 | Heavy amounts of localized and general corrosion |
| 12 | 8 | Heavy amounts of localized and general corrosion |
| 13 | >13 | 1-2 small blemishes of localized corrosion |
| 13 | >13 | No signs of corrosion |

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method for corrosion control in aqueous systems, the method comprising:
   providing a formulation, the formulation comprising an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid; and
   delivering the formulation to an aqueous stream in an amount of about 1 ppm to about 1000 ppm,
   wherein the formulation has a pH range that is (a) less than 4, or (b) is greater than 10.

2. The method as recited in claim 1, wherein the aluminum corrosion inhibitor comprises an aluminum salt.

3. The method as recited in claim 2, wherein the aluminum salt comprises aluminum halides, aluminum sulphate, aluminum hydroxide, aluminum phosphate, aluminum oxide, sodium aluminate, or combinations thereof.

4. The method as recited in claim 1, wherein the aluminum corrosion inhibitor comprises complexes of (i) citrate and aluminum, (ii) saccharic acid and aluminum, or (iii) aluminum and gluconate.

5. The method as recited in claim 1, wherein the aluminum corrosion inhibitor is selected from the group consisting of aluminum sulfate and sodium aluminate.

6. The method as recited in claim 5, wherein the aluminum corrosion inhibitor is aluminum sulfate and is present at a concentration of approximately 0.1-2 wt % actives.

7. The method as recited in claim 5, wherein the aluminum corrosion inhibitor is sodium aluminate is present at a concentration of approximately 0.1-2 wt % actives.

8. The method as recited in claim 1, wherein the formulation comprises polymaleic acid, polycarboxylic sulfonic acid polymer, polyacrylic acid, hydroxyacids, phosphonocarboxylic acids, polyhydroxysuccinic acids, polymaleic anhydride, phosphonates, 1-Hydroxy Ethylidene-1,1-Diphosphonic Acid, 2-Phosphonobutane-1,2,4-tricarboxylic acid, amino alkylene phosphonic acids, polymers featuring one monomeric group with a phosphonic acid, or combinations thereof.

9. The method as recited in claim 8, wherein the formulation comprises a polycarboxylic sulfonic acid polymer.

10. The method as recited in claim 8, wherein the formulation comprises a polymaleic acid/polycarboxylic sulfonic acid polymer blend.

11. The method as recited in claim 1, wherein the formulation comprises a polycarboxylic acid polymer, and the polycarboxylic acid polymer is present at a concentration of about 3 to about 50% polymer actives.

12. The method as recited in claim 11, wherein the concentration ratio of the aluminum corrosion inhibitor to the polycarboxylic acid polymer is greater than about 1:100.

13. The method as recited in claim 1, wherein the aqueous stream comprises an industrial water-cooling system.

14. The method as recited in claim 1, wherein the formulation has a pH that is less than 2.

15. The method as recited in claim 1, wherein the formulation has a pH that is greater than 12.

16. A method for corrosion control in aqueous systems, the method comprising:
providing a formulation, the formulation comprising an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid; and
delivering the formulation to an aqueous stream,
wherein the aluminum corrosion inhibitor is aluminum sulfate or sodium aluminate, wherein the aluminum corrosion inhibitor is present at a concentration of approximately 0.1-2 wt % actives, and wherein the pH of the formulation is (a) less than 4, or (b) greater than 10.

17. A method for corrosion control in aqueous systems, the method comprising:
providing a formulation, the formulation comprising an aluminum corrosion inhibitor and (i) a polycarboxylic acid polymer, (ii) a sulfonic acid polymer, (iii) a combination of a polycarboxylic acid and a polysulfonic acid, (iv) an organic phosphonate, (v) a combination of a phosphonate and a polycarboxylic acid, or (vi) a combination of a phosphonate and a polysulfonic acid; and
delivering the formulation to an aqueous stream,
wherein the pH of the formulation is greater than 12.

* * * * *